Jan. 17, 1939.  E. K. PORTMAN-DIXON  2,144,564
APPARATUS FOR CHECKING RECEIPTS
Filed July 26, 1938  2 Sheets-Sheet 1
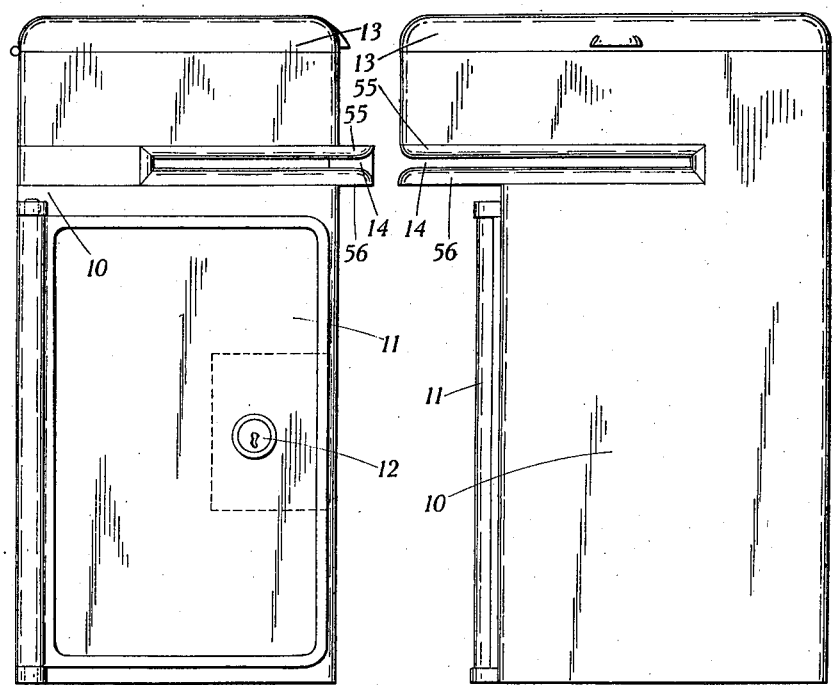
Fig. 1.
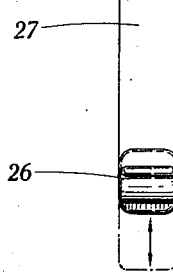
Fig. 2.
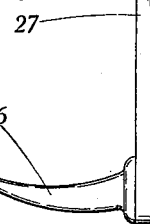
Fig. 7.
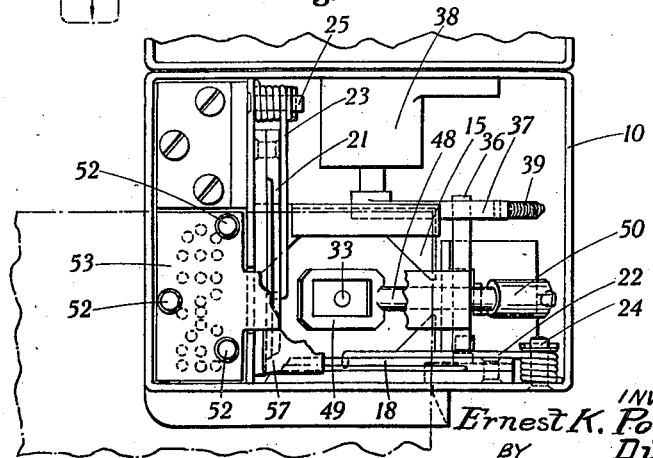
INVENTOR
Ernest K. Portman-Dixon.
BY William C. Linton.
ATTORNEY Jan. 17, 1939.　　E. K. PORTMAN-DIXON　　2,144,564
APPARATUS FOR CHECKING RECEIPTS
Filed July 26, 1938　　2 Sheets-Sheet 2
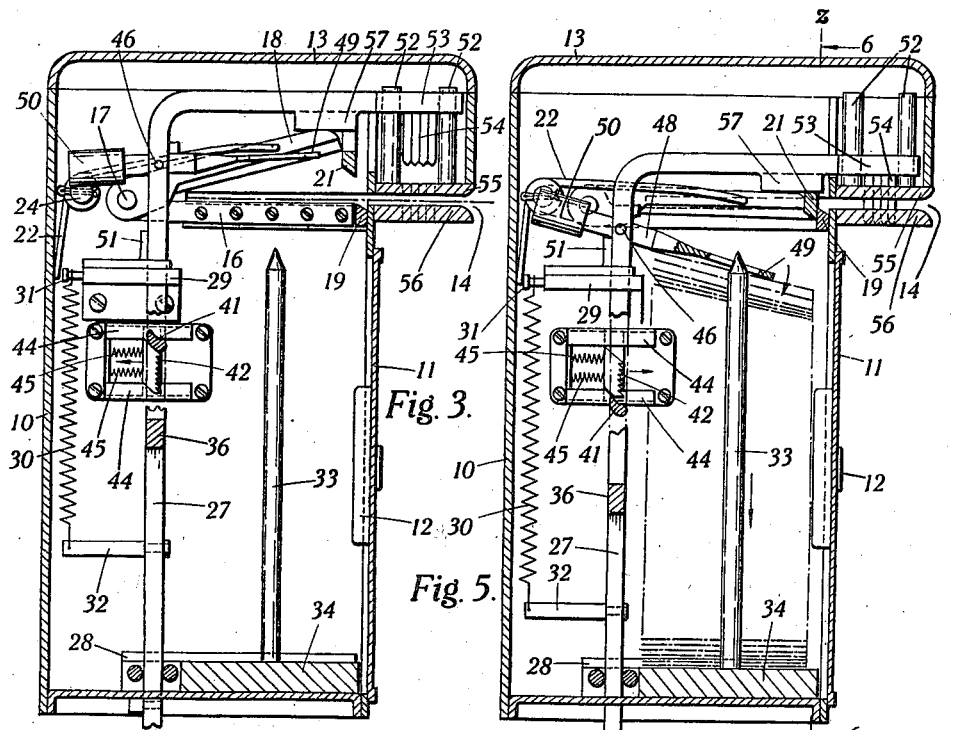
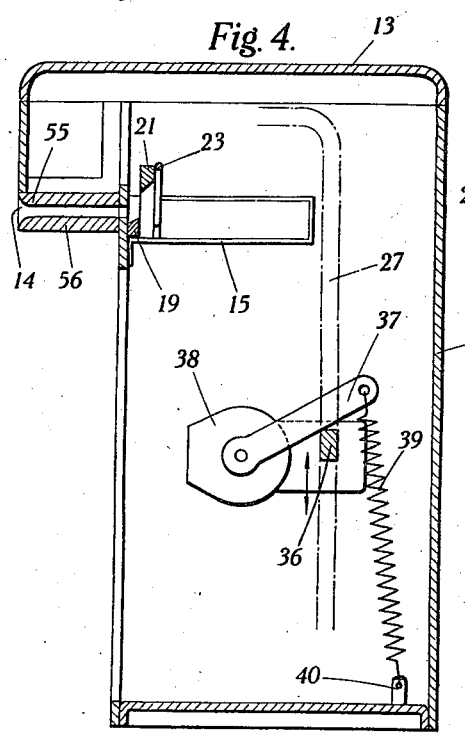
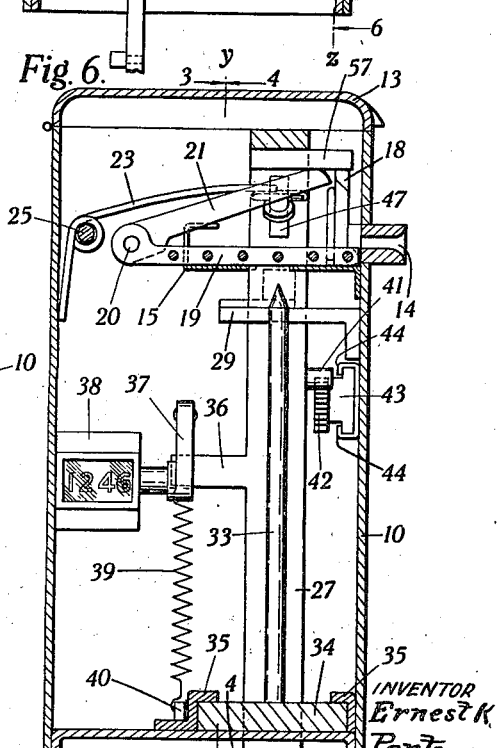

Patented Jan. 17, 1939

2,144,564

UNITED STATES PATENT OFFICE 2,144,564

APPARATUS FOR CHECKING RECEIPTS

Ernest Kemp Portman-Dixon, Teddington, England

Application July 26, 1938, Serial No. 221,454
In Great Britain June 23, 1937

2 Claims. (Cl. 101—26)

This invention relates broadly to apparatus for checking receipts and, more specifically, it refers to the filing of the counterfoils of bills such as are presented to customers for cash payments in cafés, restaurants, railway dining cars, air liners, pleasure steamers, shops, stores, and elsewhere, for goods supplied or refreshments consumed; and the invention has for its principal object to prevent, or to facilitate the detection of, the commission of fraud by the improper presentation by an employee of the same bill to a number of customers, another object being to enable the records of cash sales to be easily and expeditiously filed in security until such time as it may be convenient or necessary to make up the books and/or check the daily or weekly takings.

In the present system of collecting cash payments from customers in the circumstances referred to above, it is usual for the employee to present to the customer a written and generally serially numbered bill (ordinarily on a sheet or slip of thin paper) and, having received payment, to cancel the bill by detaching therefrom a perforated and correspondingly serially numbered marginal portion thereof, one portion being retained by the customer and the other by the employee for placing either on or in some form of file to await the checking of the cash received. If the cancellation portion or counterfoil be not detached immediately payment is received and the customer is not vigilant, it is possible for the same bill to be presented to one or more other customers so that the employee may collect monies in respect of which he has not made out the requisite bill or bills. On the other hand, these counterfoils sometimes become mislaid or lost and accurate checking of the cash sales is then rendered impossible.

According to the present invention, a bill of the kind referred to is cancelled by manually operated means which sever therefrom a portion thereof showing the amount of the purchase involved, which portion is immediately thereafter mechanically impaled upon a filing member from which it is incapable of unauthorized withdrawal.

The severing means and the filing member are preferably disposed within a locked receptacle through which an actuator projects and which is provided with a slot for the introduction of the portion of the bill that is to be cancelled.

Means may be provided, if desired, preferably operating in conjunction with said actuator, whereby to receipt that portion of the bill to be returned to the customer.

In addition, means such as any known type of counter mechanism coacting with said actuator may be provided in order to indicate the number of times the severing mechanism has been operated.

The portion severed from a bill may be of any shape or size, cut partly from the length and partly from the breadth, or cut entirely from the length or entirely from the breadth of the bill, or cut from within the edges thereof.

The receipting of that portion of the bill for return to a customer may be effected either by printing, stamping or perforating the same, and when receipting mechanism is employed the receptacle is preferably provided or constructed with means to support the bill externally of the receptacle.

One constructional embodiment of the invention is illustrated by way of example in the accompanying drawings in which Figures 1 and 2 are, respectively, a front and a side view of the apparatus. Figures 3, 4, 5 and 6 are vertical sections, Figures 3 and 5, which are similar views of the parts in different positions, being taken on the line y, y, in Figure 6 in the direction of the arrows 3, 3, Figure 4 being taken on the same line in the direction of the arrows 4, 4, and Figure 6 being taken on the line z, z, in Figure 5 in the direction of the arrows 6, 6. Figure 7 is a plan view with the cover opened.

10 is an enclosed metal casing to the interior of which access may be had by way of a hinged door 11 in front secured by a lock 12. The top of the casing is closed by a non-removable cover 13, a short distance below which a flared or flanged slot 14 is formed partly in the front wall and partly in an adjacent side wall of the casing, and within the casing adjacent the slot 14 are fixed horizontal guides constituting a skeleton platen 15 to support a counterfoil when inserted through the slot 14, as shown in dot-and-dash lines in Figure 7.

Also within the casing and adjacent the slot 14 are arranged severing means comprising, a stationary blade 16 fixed to the side wall of the casing 10 (Fig. 3) and having pivoted to it at 17 a movable blade 18, and a stationary blade 19 fixed to the front wall of the casing (Fig. 6) and having pivoted to it at 20 a movable blade 21, these blades 18 and 21 being respectively provided with return springs 22 and 23 anchored by fixed pins 24 and 25.

26 is a finger borne at the lower end of an actuator or pull-rod 27 extending vertically upwards of the casing 10 through slotted guides or brackets 28 and 29 and bent horizontally forwardly at its upper end, this pull-rod having a return spring 30 anchored between a pin 31 on the bracket 29 and an arm 32 (Figs. 3 and 5) projecting from the rod 27.

33 is a spiked prong located centrally of and terminating below the level of the skeleton platen 15 and, for convenience, having its lower end fixed to a base plate 34 which slides under flanged guides 35, 35, secured at the bottom of the casing 10.

Projecting laterally from one side of the pull-rod 27 is an arm 36 (Figs. 4 and 6) which is adapted to contact with the actuating lever 37 of a counting indicator 38 fixed to one side wall of the casing 10, the lever 37 having attached to its outer extremity one end of a return spring 39 the other end of which is anchored to a short post 40 fixed to the bottom of the casing.

Also, projecting laterally from the pull-rod 27, on the opposite side thereof from the arm 36, is a lug or detent 41 adapted to ride over the toothed face 42 of a block 43 mounted slidably in horizontal guides 44, 44, wherein the block is controlled by return springs 45, 45.

Mounted pivotally at 46 in a slot 47 in the pull-rod 27, above the level of the upper extremity of the spiked prong 33, is a beam 48 the forward end of which carries a presser member in the form of an apertured plate 49 and the rearward end of which is enlarged or carries a counterweight 50, and in rear of the pull-rod 27 an upwardly projecting lug or stop 51 is formed on or carried by the bracket 29.

The horizontal forwardly projecting upper end of the pull-rod 27 extends into the front upper portion of the head of the casing and is apertured to engage slidably three posts 52, 52, 52, serving as guides for the enlarged end 53 of the pull-rod which carries a series of perforator pins 54 arranged in the form of the word "Paid" and adapted to pass into corresponding apertures in perforated plates 55 and 56 constituting flanges adjacent to the upper and lower edges respectively of the slot 14 (Figs. 3 and 5).

The horizontal forwardly projecting upper end of the pull-rod 27 is formed with a transverse plate 57 adapted to contact with the hinged blades 18 and 21 (Figs. 3, 5 and 6) in order that, when the pull-rod 27 is operated, these blades may be caused to close on their co-acting blades 16 and 19.

The operation of the apparatus is as follows in order to cancel a bill.

When the bill has been made out, the lower end, which bears near one corner thereof the figures indicating the amount of the purchase involved, is inserted through the slot 14, as indicated by the dot-and-dash lines in Figure 7, and the actuator or pull-rod 27 is drawn down to the full extent of its movement, that is to say from the position in which it is shown in Figure 3 into the position in which it is shown in Figure 5.

Initially, the perforator pins 54 pierce the bill and thereby hold it firmly on the shelf or plate 56 as the transverse plate 57 comes into operation and presses the hinged blades 18 and 21 downwardly into action with their co-acting fixed blades 16 and 19, thereby severing from the bill the required portion which drops on to the skeleton platen 15. Thereupon, as the rod 27 continues to descend, the presser member 49 is moved angularly downwards by being brought into contact with the stop 51 and forces the severed portion of the bill through the platen 15 and impales it on the post 33 down which the severed portion ultimately drops, as seen clearly in Figure 5.

During the downward stroke of the rod 27 the arm 36 on it strikes the actuating lever 37 of the counter 38, and the detent 41 on the rod 27 passes over the toothed face 42 of the spring-controlled slidable block 43 and, if the rod 27 has been pulled down to its full extent, the detent 41 passes beneath the inclined lower surface of the toothed face 42 (as shown in Figure 5) and, on the return stroke of the rod 27 it rides up the rear face and regains the position shown in Figure 3. If, however, the rod 27 is inadvertently not pulled down to the full extent, the detent 41 engages with the toothed face 42 and prevents the return of the rod 27 to its uppermost position until it has been pulled down to the full extent. When the rod 27 is locked in an intermediate position the perforator pins 54 remain engaged with the bill which is not released until a full stroke of the rod 27 has been completed.

What I claim is:—

1. Apparatus for checking receipts, comprising a locked receptacle formed with an admission slot for the introduction of a portion of a bill to be cancelled, angularly movable cutters located interiorly of said casing adjacent said slot, a filing post within said receptacle, guides to support the inserted portion of the bill, an angularly movable presser member adapted to be brought into contact with the inserted portion of the bill, and a pull-rod serving on its outward stroke to actuate in succession the cutters and the presser member whereby to sever and impale on the filing post a portion of the bill showing the amount of the purchase involved.

2. Apparatus for checking receipts, comprising a locked receptacle formed with an admission slot for the introduction of a portion of a bill to be cancelled, angularly movable cutters located interiorly of said casing adjacent said slot, a filing post within said receptacle, guides to support the inserted portion of the bill, an angularly movable presser member adapted to be brought into contact with the inserted portion of the bill, a pull-rod serving on its outward stroke to actuate in succession the cutters and the presser member whereby to sever and impale on the filing post a portion of the bill showing the amount of the purchase involved, and perforating means operable just prior to said cutters to receipt that portion of the bill not filed.

ERNEST KEMP PORTMAN-DIXON.